(12) United States Patent
Ji et al.

(10) Patent No.: US 10,708,002 B2
(45) Date of Patent: Jul. 7, 2020

(54) ADAPTIVE CHANNEL ESTIMATION FOR POWER OPTIMIZATION FOR NARROW BAND SYSTEMS

(71) Applicant: APPLE INC., Cupertino, CA (US)

(72) Inventors: Zhu Ji, San Jose, CA (US); Yang Li, Plano, TX (US); Johnson O. Sebeni, Fremont, CA (US); Junsung Lim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/050,957

(22) Filed: Jul. 31, 2018

(65) Prior Publication Data

US 2019/0044660 A1 Feb. 7, 2019

Related U.S. Application Data

(60) Provisional application No. 62/540,237, filed on Aug. 2, 2017.

(51) Int. Cl.
| | |
|---|---|
| *H04L 1/18* | (2006.01) |
| *H04L 5/00* | (2006.01) |
| *H04W 72/12* | (2009.01) |
| *H04W 72/04* | (2009.01) |
| *H04L 1/20* | (2006.01) |
| *H04W 72/08* | (2009.01) |

(52) U.S. Cl.
CPC .......... *H04L 1/1809* (2013.01); *H04L 1/1835* (2013.01); *H04L 1/20* (2013.01); *H04L 5/0044* (2013.01); *H04L 5/0048* (2013.01); *H04L 5/0051* (2013.01); *H04L 5/0053* (2013.01); *H04W 72/042* (2013.01); *H04W 72/1289* (2013.01); *H04W 72/08* (2013.01)

(58) Field of Classification Search
CPC ... H04W 28/04; H04W 72/04; H04W 72/042; H04W 88/08; H04L 5/0007
USPC .......................................................... 370/329
See application file for complete search history.

(56) References Cited

U.S. PATENT DOCUMENTS

| | | | | |
|---|---|---|---|---|
| 7,254,171 B2 * | 8/2007 | Hudson | ................ | H04B 1/7102 333/18 |
| 9,304,974 B1 * | 4/2016 | Tomkins | ............. | G06F 17/2765 |
| 2011/0116411 A1 * | 5/2011 | Hwang | ............. | H04W 72/0406 370/252 |
| 2015/0180630 A1 * | 6/2015 | Zhu | .......................... | H04B 7/04 370/330 |
| 2015/0245323 A1 * | 8/2015 | You | ..................... | H04W 72/042 370/329 |

\* cited by examiner

*Primary Examiner* — Peter G Solinsky
*Assistant Examiner* — Sanjay K Dewan
(74) *Attorney, Agent, or Firm* — Fay Kaplun & Marcin, LLP

(57) ABSTRACT

A device, system and method for determining when to initiate certain operations associated with received data. The method is performed at a device connected to a network. The method includes estimating a first number of repetitions of a subframe which is associated with a likelihood that the device will successfully perform an operation based on the subframe. The method further includes delaying initiating the operation for the subframe until a received number of repetitions of the subframe is greater than or equal to the first number of repetitions.

27 Claims, 8 Drawing Sheets

| | 420 | 430 | 440 | 450 | 460 | 470 | 480 |
|---|---|---|---|---|---|---|---|
| Time 411 | 1 | 2 | 3 | 4 | 5 | 6 | 7 |
| Subframe Received 412 | MPDCCH | | PDSCH | PDSCH | PDSCH | PDSCH | |
| Receiver Mode 413 | ON | SAVE | ON | ON | ON | ON | SAVE |
| Subframe Buffer 414 | EMPTY | EMPTY | 1 | 2 | 3 | 3 | EMPTY |
| Channel Estimation PDSCH 415 | | | | | | ON | |
| Demodulation PDSCH 416 | | | | | | ON | |
| Decoding PDSCH 417 | | | | | | ON | |

ADAPTIVE CHANNEL ESTIMATION FOR POWER OPTIMIZATION FOR NARROW BAND SYSTEMS

PRIORITY/INCORPORATION BY REFERENCE

This application claims priority to U.S. Provisional Application 62/540,237 entitled "Device, System, and Method for Adaptive Channel Estimation for Power Optimization for Narrow Band Systems," filed on Aug. 2, 2017, the entirety of which is incorporated herein by reference.

BACKGROUND INFORMATION

A user equipment (UE) may be configured to establish a connection to at least one of a plurality of different networks or types of networks to perform a variety of different functionalities via the network connection. For example, the UE may communicate with another UE through the network connection. In another example, the UE may communicate with various servers to exchange data.

A UE and a network may communicate by exchanging subframes over a communication channel. The communication channel may correspond to a bandwidth range and a bandwidth range may correspond to the maximum amount of data that may be sent over the communication channel for a duration. A bandwidth range may be referred to as a band and characterized as a wideband or a narrowband. For example, in the 3GPP Release 13, enhanced MTC (eMTC) or Category-M1 devices are introduced and may utilize a narrowband that has a range of 1.4 MHz (e.g., a 6 resource block (RB) narrowband). Wideband operations may utilize a wider bandwidth compared to narrowband operations. Thus, wideband operations may utilize larger subframes and transport more data. However, an increase in bandwidth range correlates to an increase in the amount of power consumed by the UE. In contrast, limiting the bandwidth range may conserve power but less data may be transported.

When the UE has established a connection with the network, the UE may receive a subframe over a control channel. However, due to a variety of factors the UE may be unable to demodulate data within the subframe, decode data within the subframe or perform channel estimation based on data within the subframe. Conventionally, a network accounts for this by repeatedly transmitting subframes to the UE via the control channel. Thus, conventionally, the UE may receive a first subframe at a first time over the control channel, a second subframe at a second time over the control channel, a third subframe at a third time over the control channel, etc. In legacy approaches, the UE may attempt to demodulate, decode and perform channel estimation after each subframe is received. As described above, the UE may be unable to perform these operations and thus, the UE may perform several unsuccessful attempts of these operations (e.g. demodulation, decoding, channel estimation, etc.). Thus, a UE may waste a significant amount of power performing unsuccessful attempts of these operations.

Conventional systems not only waste power performing unsuccessful operations but conventional systems also waste power due to latency corresponding to the initiation of these operations (e.g. demodulation, decoding, channel estimation, etc.). For example, in legacy approaches a UE waits for the entire duration of a subframe to be received prior to initiating certain operations (e.g. demodulation, decoding, channel estimation, etc.). However, the UE may have received all of the data it needs to initiate these operations after only a first portion of the first subframe has been received. Thus, a UE may be unnecessarily waiting to initiate these operations until the UE receives the remaining portion of the first subframe. Consequently, this latency delays the UE from being able to enter a power saving mode.

As mentioned above, CAT-M1 devices support narrowband operations. These types of devices may utilize the CAT-M1 physical downlink control channel (MPDCCH) to receive, from the network, control information that may coordinate the subsequent reception of data via a physical downlink shared channel (PDSCH). For example, a MPDCCH subframe received at the k subframe may schedule a PDSCH subframe at the k+2 subframe. These devices may be vulnerable to the deficiencies noted above with regard to legacy approaches. For example, the network may schedule the transmission of a first MPDCCH subframe at a first time and a second MPDCCH subframe at a second time because, but due to a variety of factors, it is likely the UE will not be able to successfully perform certain MPDCCH operations (e.g. demodulation, decoding, channel estimation, etc.) after the reception of only the first subframe at the first time. Thus, under legacy approaches, a UE receives the first MPDCCH subframe at the first time, waits for the entire duration of the MPDCCH subframe to be received, then unsuccessfully attempts to perform certain MPDCCH operations (e.g. demodulation, decoding, channel estimation, etc.). The UE then receives a second MPDCCH subframe at the second time, waits for the entire duration of the second MPDCCH subframe to be received (despite receiving the data necessary to perform MPDCCH operations after receiving only a first duration of the second subframe), then successfully initiates MPDCCH operations (e.g. demodulation, decoding, channel estimation, etc.). The exemplary embodiments cure the above noted deficiencies by avoiding attempts to perform certain operations (e.g. demodulation, decoding, channel estimation, etc.) that are unlikely to be successful and eliminating latency associated with the initiation of these operations.

SUMMARY

The exemplary embodiments describe a method performed at a user equipment. The method includes estimating a first number of repetitions (Ns) of a subframe which is associated with a likelihood that the user equipment will successfully perform an operation based on the subframe. Further, the method includes delaying initiating the operation for the subframe until a received number of repetitions of the subframe (Nr) is greater than or equal to the first number of repetitions (Ns).

According to another exemplary embodiment, a user equipment has a transceiver configured to establish a connection with a cell and a baseband processor connected to the transceiver. The baseband processor is configured to estimate a first number of repetitions (Ns) of a subframe which is associated with a likelihood that the UE will successfully perform an operation based on the subframe. The baseband processor is further configured to delay initiating the operation for the subframe until a received number of repetitions of the subframe (Nr) is greater than or equal to the first number of repetitions (Ns).

According to a further exemplary embodiment, a method performed at a user equipment includes determining a number of repetitions of a subframe to be received by the user equipment, wherein each of the repetitions of the subframe includes a plurality of OFDM symbols. Further, the method includes when the number of repetitions is equal to one, determining whether to initiate an operation based on receiving all the OFDM symbols of the subframe or a portion of the OFDM symbols of the subframe and when the number of repetitions is greater than one, determining whether to initiate the operation based on receiving all the OFDM symbols of the number of repetitions of the subframe or less than all of the OFDM symbols of the number of repetitions of the subframe.

According to another exemplary embodiment, a user equipment has a transceiver configured to establish a connection with a cell and a baseband processor connected to the transceiver. The baseband processor is configured to determine a number of repetitions of a subframe to be received by the user equipment, wherein each of the repetitions of the subframe includes a plurality of OFDM symbols. Further, when the number of repetitions is equal to one, the baseband processor is configured to determine whether to initiate an operation based on receiving all the OFDM symbols of the subframe or a portion of the OFDM symbols of the subframe. When the number of repetitions is greater than one, the baseband processor is configured to determine whether to initiate the operation based on receiving all the OFDM symbols of the number of repetitions of the subframe or less than all of the OFDM symbols of the number of repetitions of the subframe.

BRIEF DESCRIPTION OF THE DRAWINGS

FIG. 4 shows a table that provides an example of when a UE performs certain operations according to various exemplary embodiments described herein.

DETAILED DESCRIPTION

Figure 1:
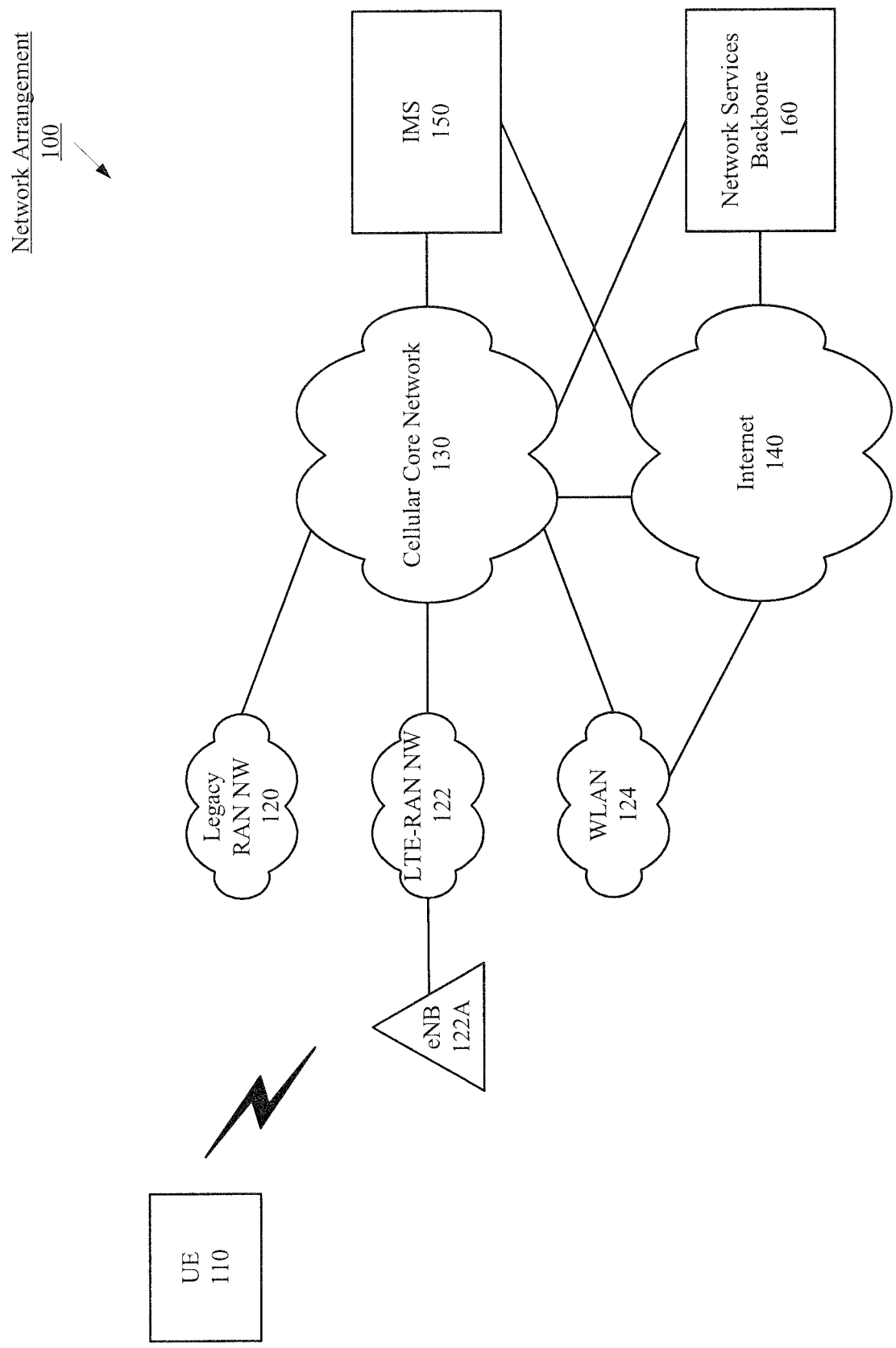
FIG. 1 shows a network arrangement according to the various exemplary embodiments described herein.

The exemplary embodiments may be further understood with reference to the following description and the related appended drawings, wherein like elements are provided with the same reference numerals. The exemplary embodiments are related to a device, system, and method for adaptive channel estimation for power optimization. The exemplary embodiments may address the above noted deficiencies of conventional systems by initially estimating the number of subframes that the UE may receive before commencing successful performance of certain operations (e.g. demodulation, decoding, channel estimation, etc.). The exemplary embodiments will then buffer the received subframes and not attempt to perform certain operations until the estimated number of subframes is received. Thus, the exemplary embodiments avoid performing certain operations (e.g. demodulation, decoding, channel estimation, etc.) if the UE determines that an attempt to perform certain operations will likely be unsuccessful. The exemplary embodiments may also save power during certain operations (e.g. demodulation, decoding, channel estimation, etc.) by eliminating latency associated with initiating certain operations.

Initially, it is noted that the exemplary embodiments are described with regard to a UE. However, the use of a UE is merely for illustrative purposes. The exemplary embodiments may be utilized with any electronic component that may establish a connection with a network and configured with the hardware, software, and/or firmware to perform certain operations such as demodulation, decoding, channel estimation, etc. Therefore, the UE as described herein is used to represent any electronic component.

Further, it is noted that the exemplary embodiments are described with regard to the network being a LTE network and the base station of the network being an eNB. However, it should be noted that the use of the LTE network and the eNB is merely for illustrative purposes. Those skilled in the art will understand that the network may be any network and the base station may be any type of base station within the corresponding network.

The exemplary embodiments may be described with regard to the transmission and reception of control channels and shared channels over narrow bandwidth. However, the use of control channels and shared channels are merely for illustrative purposes and the exemplary embodiments may apply to any type of telecommunication channel. Further, the use of narrow bandwidth is also for illustrative purposes and the exemplary embodiments may apply to any type of operating bandwidth.

The exemplary embodiments provide a solution to the above noted deficiencies by buffering at least a portion of each received subframe until a predetermined threshold associated with the received subframes is satisfied. Until the predetermined threshold is satisfied certain operations performed by the UE may remain inactive, thereby saving power and processing resources. After the predetermined threshold is satisfied, the inactive operations may resume and utilize the buffered data corresponding to the subframes. Thus, buffering is performed to avoid unsuccessful operations and save power.

The exemplary embodiments also provide a solution to the above noted latency deficiencies by initiating certain operations (e.g. demodulation, decoding, channel estimation, etc.) prior to reception of the entire duration of a subframe. Thus, the exemplary embodiments may allow a UE to eliminate latency associated with certain operations by initiating and performing these operations earlier than compared to conventional approaches. Consequently, the UE enters sleep mode or power saving mode as soon as possible and a significant amount of power may be saved.

FIG. 1 shows an exemplary network arrangement 100 according to various exemplary embodiments described herein. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Cat-M devices, Cat-M1 devices, MTC devices, eMTC devices, etc. It should also be understood that an actual network arrangement may include any number of UEs being used by any number of users. Thus, the example of a single UE 110 is merely provided for illustrative purposes.

The UE 110 may be configured to communicate directly with one or more networks. In the example, the networks with which the UE may wirelessly communicate are a legacy radio access network (RAN) 120, a LTE radio access network (LTE-RAN) 122 and a wireless local access network (WLAN) 124. However, it should be understood that the UE 110 may also communicate with other types of networks and the UE 110 may also communicate with networks over a wired connection. With regards to the exemplary embodiments, the UE 110 may establish a connection with the LTE-RAN 122. For example, the UE 110 may have a LTE chipset and communicate with the LTE-RAN 122. However, it should be noted that the use of the LTE-RAN 122 is merely for illustrative purposes and the exemplary embodiments may utilize any type of network.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base stations (Node Bs, eNodeBs, HeNBs, etc.) that are configured to send and receive traffic from UEs that are equipped with the appropriate cellular chip set. The WLAN 124 may include any type of wireless local area network (WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The exemplary embodiments relate to the UE 110 connecting to the LTE-RAN 122 via an evolved Node B (eNB) 122A. As mentioned above, the use of the LTE-RAN 122 is for illustrative purposes and any type of network may be used. Those skilled in the art will understand that any association procedure may be performed for the UE 110 to connect to the LTE-RAN 122. For example, as discussed above, the LTE-RAN 122 may be associated with a particular cellular provider where the UE 110 and/or the user thereof has a contract and credential information (e.g., stored on a SIM card). Upon detecting the presence of the LTE-RAN 122, the UE 110 may transmit the corresponding credential information to associate with the LTE-RAN 122. More specifically, the UEs 110-114 may associate with a specific access point (e.g., the eNB 122A of the LTE-RAN 122).

The eNB 122A may be configured to exchange data with the UE 110 through scheduled data transmissions defined using control information. For example, the eNB 122A may transmit scheduling information for data exchange via a physical downlink control channel (PDCCH) and the data corresponding to the scheduling information via a physical downlink shared channel (PDSCH). The eNB 122A may also exchange the data that is scheduled in the control information. When receiving data from the eNB 122A (both control information and other types of data), the UE 110 may receive cell-specific reference signal (CRS) tones that are present in the bandwidth associated with the network and/or base station which are present in each transmission time interval (TTI). Using the CRS tones, a variety of network parameters may be measured by the UE 110, such as downlink power. The eNB 122A may broadcast CRS tones during each TTI, whether or not there is data scheduled to be exchanged with the UE 110. Accordingly, the UE 110 may receive the CRS tones when monitoring for them.

The UE 110 may be assigned a narrow bandwidth within the overall bandwidth for the UE 110 to monitor. For example, in the 3GPP Release 13, enhanced MTC (eMTC) or Category-M1 devices are introduced for power efficient and coverage limited operation. Specifically, the narrow bandwidth reduces the overall monitored bandwidth to 1.4 MHz (e.g., a 6 resource block (RB) narrowband). The exemplary embodiments will be described with regard to narrow bandwidth operations. However, the use of 1.4 MHZ is merely exemplary and the UE 110 may be configured for wide band operations or any type of narrow bandwidth operations.

The narrow bandwidth operations utilize a smaller sample size compared to wide band operations and thus, a limited number of CRS tones may be available. Those skilled in the art will understand that a limited number of CRS tones may adversely affect how measurements are determined. For example, the CRS tones may be used for channel estimation, in measuring parameters used for filter coefficients of channel estimation (e.g., delay spread, Doppler spread, etc.), in measuring various network parameters (e.g., reference signal received power (RSRP), received signal strength indicator (RSSI), reference signal received quality (RSRQ), channel state information (CSI), channel quality indicator (CQI), rank indicator (RI), precoding matrix indicator (PMI), etc.) for a wide-band report, etc. With all these different measurements being made based on the CRS tones that are received, fewer CRS tones may result in less reliable and/or inadequate measurements being determined. Thus, the tradeoff from using the narrow bandwidth to monitor for CRS tones is less power consumption per TTI but lower demodulation performance (e.g., due to worse channel estimations) and/or inaccurate measurements (e.g., resulting in improper handover consequences).

It should be noted that while CRS tones may be transmitted over a PDSCH scheduled by a PDCCH during narrow bandwidth operations, certain devices may utilize a different type of tone and a different type of channel. For example, CAT-M1 devices support narrow bandwidth operations and use the CAT-M1 physical downlink control channel (MPDCCH). The MPDCCH may schedule the PDSCH and may utilize demodulation reference signals (DMRS). Thus, during narrow bandwidth operations the UE 110 may receive DMRS tones over a MPDCCH. The exemplary embodiments will be described with regard to DMRS over a MPDCCH and CRS over a PDSCH. However, it should be noted that the use of these channels and corresponding tones is merely for illustrative purposes and the exemplary embodiments may utilize any type of communication channel and any type of corresponding tone.

Figure 2:
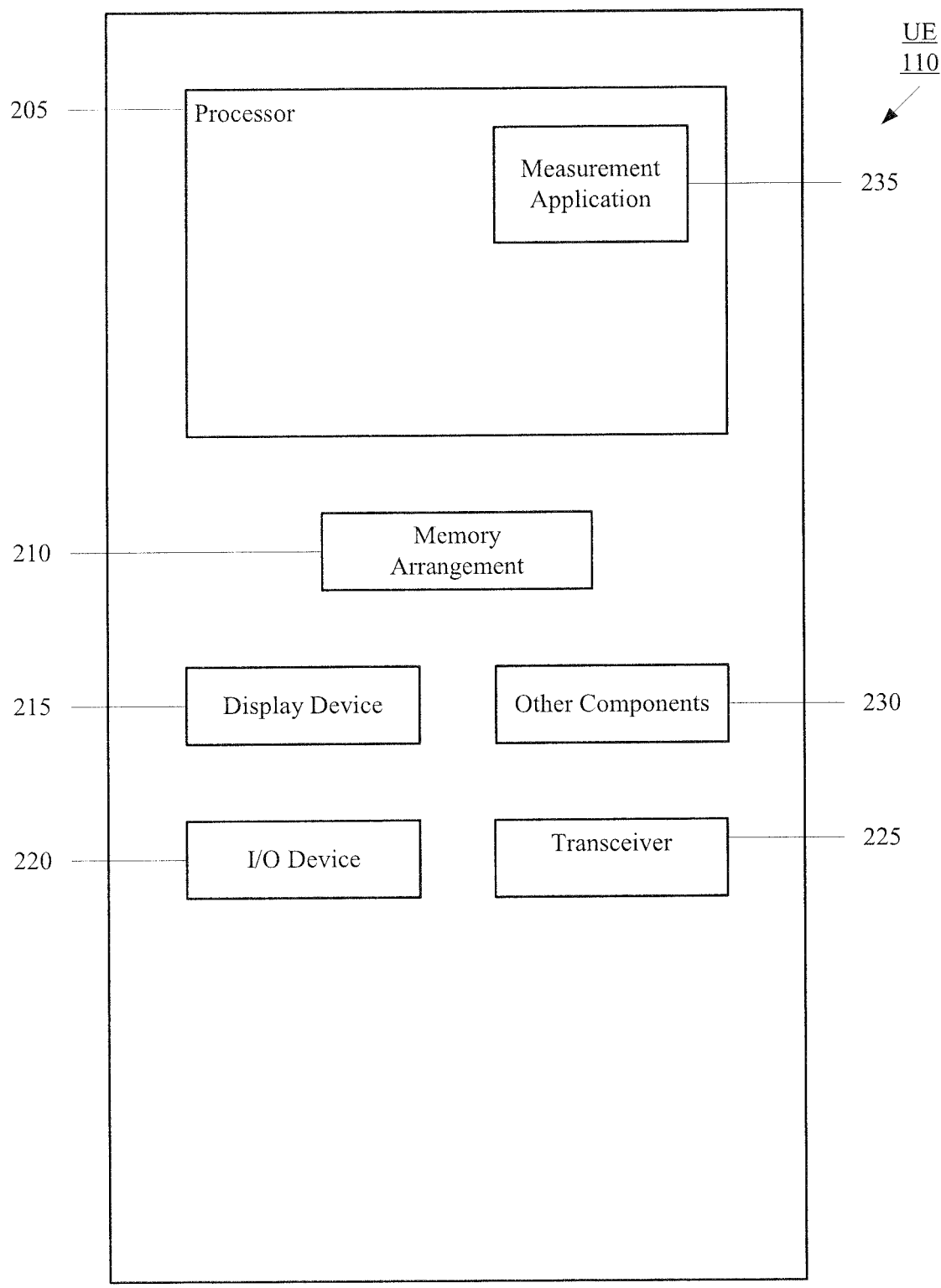
FIG. 2 shows a user equipment according to the various exemplary embodiments described herein.

FIG. 2 shows an exemplary UE 110 according to various exemplary embodiments. The UE 110 may be any electronic component that is configured to connect to a network and perform wireless functionalities. For example, the UE 110 may be a portable device such as a phone, a smartphone, a tablet, a phablet, a laptop, a wearable computing device, an Internet of Things (IoT) device (e.g., Category-M or Category M1), Machine-Type Communication (MTC) devices, enhanced MTC (eMTC) devices, etc. In another example, the UE 110 may be a stationary device such as a desktop terminal. The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of applications of the UE 110. For example, the applications may include a measurement application 235. The measurement application 235 may be configured to determine a variety of different measurements such as a channel estimation, a RSRP, a RSRQ, a RSSI, etc. The measurement application 235 may be configured to make measurements during narrow bandwidth operation. Those skilled in the art will understand how these measurements may be determined using any suitable calculation or algorithm.

It should be noted that the measurement application being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor. The exemplary embodiments may be implemented in any of these or other configurations of a UE. For illustrative purposes, the processor 205 may be a baseband processor.

The memory 210 may be a hardware component configured to store data related to operations performed by the UE 110. As will be described in further detail below, the memory 210 may store data that corresponds to the number of subframes that may be received before commencing certain operations (e.g. demodulation, decoding, channel estimation, etc.) based on a variety of factors. However, the use of the memory 210 is only exemplary and the UE 110 may store this data within another component or module within the UE 110 or in a component that is external to the UE 110.

Those skilled in the art will understand that the conditions being experienced by the UE 110 may be substantially similar over a period of time, or may also change (sometimes significantly) over the course of time. For example, the UE 110 may be mobile such that at a first time, the conditions may correlate to a certain number of subframes that may be received before the UE 110 may be able to successfully perform certain operations (e.g. demodulation, decoding, channel estimation, etc.). However, at a second time, the UE 110 may have moved such that the conditions may indicate that a different number of subframes may be received before the UE 110 may be able to successfully perform certain operations. Thus, the UE 110 may be able to estimate the number of subframes that the UE 110 may receive before the UE 110 is likely to successfully perform certain operations.

The transceiver 225 may be a hardware component configured to exchange data with the eNB 122A. For example, the transceiver 225 may be configured to receive DMRS or CRS tones that are broadcast by the eNB 122A within the overall bandwidth of the LTE-RAN 122, more specifically within the assigned narrow bandwidth range. The transceiver 225 may enable communication with the LTE-RAN 122 or with other electronic devices directly or indirectly through the LTE-RAN 122 to which the UE 110 is connected. The transceiver 225 may operate on a variety of different frequencies or channels (e.g., set of consecutive frequencies). Thus, an antenna (not shown) coupled with the transceiver 225 enables the transceiver 225 to operate on the LTE frequency band.

As noted above, the processor 205 may be a baseband processor. The baseband processor 205 may perform subsequent operations to demodulate signals received via the transceiver 225. Accordingly, the baseband processor 205 may include a receiver unit, a channel estimation unit, a measurement unit, a tracking unit, etc., having the capability to utilize narrow bandwidth operations. The receiver unit may be configured to calculate a log likelihood ratio (LLR) and decode based on the received LLR. The receiver unit may also be configured to perform Hybrid Automatic Repeat Request (HARQ) operations (e.g., HARQ combine). The channel estimation unit may be a component of the measurement application 235 configured to estimate a channel coefficient and feed a corresponding output to the receiver unit. The measurement unit may also be a component of the measurement application 235 configured to estimate a RSRP, a RSSI, a RSRQ, a CQI, a RI, a PMI, etc. as well as other subsequent measurements used by the receiver unit. The tracking unit may be configured to track an automatic frequency correction (AFC), an automatic gain control (AGC), and a time to live (TTL).

Figure 3:
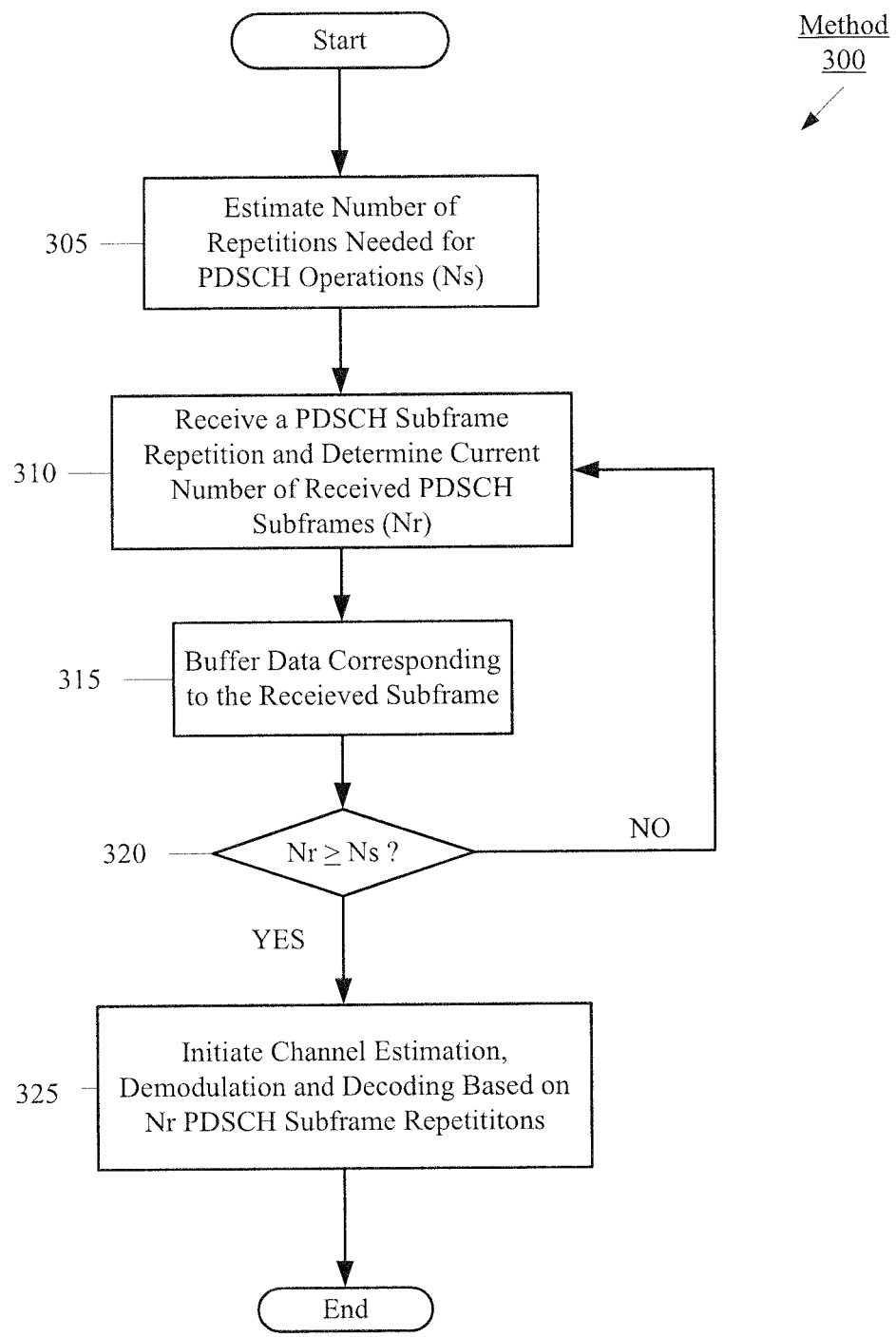
FIG. 3 shows a method for adaptively performing channel estimation for power optimization according to various exemplary embodiments described herein.

FIG. 3 shows a method 300 for adaptive channel estimation for power optimization according to various exemplary embodiments. The method 300 relates to how the UE 110 performs certain PDSCH operations (e.g. demodulation, decoding, channel estimation, etc.) on received subframes. It should be noted that the method 300 will be described with regard to PDSCH. However, the use of the PDSCH is merely exemplary and the method 300 may be performed utilizing MPDCCH or any other type of telecommunication channel when subframe repetitions are used. The method 300 will be described with regard to the network arrangement 100 of FIG. 1 and the UE 110 of FIG. 2.

Initially, it should be noted that the method 300 will be described with regard to the UE 110 after the UE 110 has been powered on and connected to the LTE-RAN 122 via the corresponding eNB 122A. Further, the method 300 will be described with regard to narrow bandwidth operations. However, as mentioned above the exemplary embodiments are not limited to narrow bandwidth operations and may apply to any type of operating bandwidth.

During the establishment of the connection between the UE 110 and the eNB 122A, the eNB 122A configures a repetition level (RL) that corresponds to a number of repetitions of a subframe that will be sent to the UE 110. For example, the eNB 122A may set the RL to three and subsequently transmit, to the UE 110, a first subframe repetition at a first time, a second subframe repetition at a second time and a third subframe repetition at a third time. However, it should be noted that the use of three repetitions is for exemplary purposes and the RL may be set to any number. Further, it should be noted that reference to a RL is merely for illustrative purposes and different eNBs or different networks may refer to the determination of the number of subframes to transmit to a UE in a different manner. It should also be noted that the term "repetition" refers to all the transmissions of the subframe. For example, the first repetition refers to the first time the subframe is transmitted.

In 305, the UE 110 estimates the number of repetitions of subframes (Ns) corresponding to a PDSCH channel that may be received before the UE 110 commences certain PDSCH related operations (e.g. demodulation, decoding, channel estimation, etc.). It should be understood that the value of Ns is related to the number of repetitions of the subframe that the UE 110 estimates will be needed for the operation to be successful and not the total number of repetitions to be received by the UE 110 as that total number is determined by the eNB 122A. This estimation may be determined based on a variety of factors such as, signal-to-noise ratio (SNR), signal-to-interference-plus-noise ratio (SINR), transmission mode, doppler spread, delay spread, etc. The estimation may be determined based on a single factor or a plurality of factors. However, the factors mentioned above are merely for illustrative purposes and any factor related to the exchange of subframes over communication channels may be used, alone or in combination, to generate the estimation.

In a first example, one or more of these input parameters may be mapped to values of Ns based on the recent historical performance of the UE 110. For example, if it is considered that the input parameter is SNR and the UE 110 has been experiencing a relatively steady SNR, the UE 110 may look at the last twenty (20) received subframes and determine the number of repetitions of those subframes that were needed to successfully perform the operations (e.g., channel estimation, demodulation, decoding, etc.). The UE 110 may then use this number of repetitions as the Ns for a current subframe. It should be noted that the above was only exemplary and that any input parameter and time frame may be used to estimate the Ns.

Further, an input parameter may be filtered to average across a certain time duration prior to being utilized to determine Ns. Thus, the input parameter may be processed by a filter to account for noise and ensure smoothness of input parameter related data. For example, the filter may be a finite impulse response (FIR) filter or an infinite impulse response (IIR) filter. It should be noted that the use of an FIR or IIR filter is merely exemplary and the input parameter may be processed by any type of filter that accounts for noise or ensures smoothness. Alternatively, the input parameters may be processed in any manner that accounts for noise or ensures smoothness of input parameter related data.

In a second example, the estimate of the number of repetitions of a subframe (Ns) may be based on a look-up table. For example, the UE 110 may query a look-up table or a plurality of look-up tables stored within the memory arrangement 210. The look-up tables may be used to map certain input parameters to a Ns value. The input parameters may include, but are not limited to, SNR, transmission mode, doppler spread or delay spread.

The UE 110 may determine a Ns based on a single input parameter or a plurality of input parameters. For example, each input parameter may have its own corresponding look-up table that produces a value related to Ns. Thus, the UE 110 may determine Ns based on a value produced by a single input parameter. Alternatively, the UE 110 may determine a Ns based on an aggregation of a plurality of values produced by a plurality of single parameter input look-up tables.

Further, a look-up table may be jointly constructed from a plurality of input parameters. For example, a look-up table may be conditioned on one input parameter and there may be multiple levels of tables each being parameterized on other inputs. Thus, a first input parameter may map to either a Ns value or an indication that a second input parameter may be used to determine Ns. The second input parameter may map to either a Ns value or an indication that a further input parameter may be used to determine Ns. Thus, the jointly constructed look-up table may determine Ns based on a single input parameter or based on a plurality of input parameters. Further, the jointly constructed look-up table may utilize any input parameter as a first input parameter.

A look-up table may be generated by the UE 110 based on historical data related to the number of repetitions of subframes the UE 110 has needed to perform certain operations (e.g. demodulation, decoding, channel estimation, etc.). Further, a look-up table may by generated by the network and the network may generate the look-up table while the UE 110 is offline. The network generated look-up table may be generated based on historical data related to the UE 110 or historical data related to a plurality of UEs. When the UE 110 goes online, the UE 110 may receive the network generated look-up table and may either store the network generated look-up table for use in determining Ns or update a currently stored look-up table in accordance with the network generated look-up table for use in determining Ns. Alternatively, the UE 110 may alter the network generated look-up table in accordance with the UE's historical data to account for differences that may be specific to the UE 110.

In 310, the UE 110 receives a PDSCH subframe and determines the current number of received PDSCH subframe repetitions (Nr). The UE 110 may utilize a counter to keep track of the current number of received PDSCH subframe repetitions. For example, if the UE 110 has not yet received a PDSCH subframe repetition for a current subframe, the counter will be set to one in response to the currently received PDSCH subframe or if the UE 110 has already received two subframe repetitions the counter will be set to three in response to the currently received PDSCH subframe. However, the use of a counter is merely for illustrative purposes and the UE 110 may keep track of the current number of received PDSCH subframes in any manner. Further, after the UE 110 performs the PDSCH related operations and method 300 ends, the current number of received PDSCH subframes may be reset.

In 315, the UE 110 may buffer at least a portion of the data corresponding to the received PDSCH subframe repetition. The portion of the data that may be buffered may be at least one CRS tone of the corresponding subframe. The UE may already be buffering at least a portion of data corresponding to a previously received PDSCH subframe repetition (e.g. a previously received CRS tone). Thus, the UE 110 has the capability of buffering a plurality of portions of data corresponding to a plurality of received PDSCH subframe repetitions.

In 320, the UE 110 compares the current number of received PDSCH subframe repetitions (Nr) to the estimate of the number of repetitions of the subframe (Ns) to determine if Nr is greater than or equal to Ns. The Ns may serve as a threshold that the UE 110 may utilize to determine when to initiate the performance of PDSCH related operations such as, demodulation, decoding, channel estimation, etc. Thus, when a new Nr is determined, the UE 110 compares Nr to Ns to determine if Nr is greater than or equal to Ns. If Nr is greater than or equal to Ns, then Nr satisfies the threshold and the method 300 continues to step 325. If Nr is less than Ns, then Nr does not satisfy the threshold and the method 300 returns to step 310.

In 325, the UE 110 initiates PDSCH related operations on the Nr subframes. For example, the UE 110 may initially estimate that three PDSCH subframe repetitions may be received to successfully perform PDSCH related operations. Accordingly, the UE 110 receives a first PDSCH subframe repetition at a first time and buffers some or all of the CRS tones received within the first subframe repetition without attempting to perform PDSCH related operations because the number of currently received subframe repetitions (Nr) does not satisfy the number of estimated subframe repetitions (Ns). Next, the UE receives a second subframe repetition at a second time and buffers some or all of the CRS tones within the second subframe repetition without attempting to perform PDSCH related operations because the number of currently received subframe repetitions (Nr) does not satisfy the number of estimated subframe repetitions (Ns). Finally, the UE 110 receives a third PDSCH subframe repetition at a third time, Nr=3. Since the UE 110 has determined that Ns=3, the UE 110 initiates PDSCH operations (e.g. demodulation, decoding, channel estimation, etc.) using the buffered information from the first two subframes and the currently received third subframe.

FIG. 4 shows a table 400 that illustrates when the UE 110 performs certain PDSCH operations (e.g. demodulation, decoding, channel estimation, etc.) according to the exemplary embodiments. For example, the table 400 applies to when the UE 110 performs certain PDSCH operations in relation to when the eNB has set the PDSCH RL to four and the UE 110 has estimated that three PDSCH subframe repetitions may be received before commencing these PDSCH operations. Thus, table 400 demonstrates that the UE 110 receives a first MPDCCH subframe at a first time 420, a first PDSCH subframe repetition at a third time 440, a second PSDCH subframe repetition at a fourth time 450, a third PDSCH subframe repetition at a fifth time 460 and a fourth PDSCH subframe repetition at a sixth time 470. It should be noted that the reception of subframes of this type and in this configuration is merely for illustrative purposes and the exemplary embodiments may apply to the reception of any type of subframes in any configuration.

The table 400 includes seven columns 420-480 that each represent a duration of time equivalent to the duration of a subframe and are in sequential order. The table 400 also includes seven labels 411-417 that describes the content of the corresponding row. As mentioned above, columns 420-480 each represent a duration of time equivalent to the duration of a subframe. Thus, each label 411-417 will describe a portion of the information in each column and the information within each column occurs during the same time duration. Time 411 indicates the sequential order of the columns. Subframe received 412 indicates whether a subframe was received during each column and what type of subframe was received. Receiver mode 413 indicates what mode, either on or power saving mode, the transceiver 225 of the UE 110 was operating during each column. Subframe buffer 414 indicates the number of subframes within the buffer of the UE 110 during each column. Channel estimation PDSCH 415 indicates whether a PDSCH channel estimation module of the UE 110 was activated during each column. Demodulation PDSCH 415 indicates whether a PDSCH demodulation module was active during each column. Decoding PDSCH 416 indicates whether a PDSCH decoding module of the UE 110 was activated during each column.

Column 420 (time 1) indicates that the UE 110 receives a MPDCCH subframe at a first time. The reception of the MPDCCH subframe means that the receiver portion of the transceiver 225 was on to receive the subframe. In this scenario, the RL set by the eNB corresponds to the PDSCH and not the MPDCCH. Thus, the UE 110 does not buffer the MPDCCH. As mentioned above, this configuration is merely for illustrative purposes and the MPDCCH may also be repeated. Further, the UE 110 does not activate the PDSCH channel estimation, the PDSCH demodulation module or the PDSCH decoding module during this duration of time 420 because the UE 110 has received a MPDCCH subframe not a PDSCH subframe. However, it should be noted that the UE may activate MPDCCH modules in response to the reception of MPDCCH subframes. For example, the UE 110 may use the information in the MPDCCH subframe to estimate the number of receptions needed for the PDSCH subframes.

Column 430 (time 2) demonstrates that after the reception of the MPDCCH subframe there is a duration of time where the eNB 122A does not transmit a MPDCCH subframe or a PDSCH subframes to the UE 110. Since the UE 110 does not receive a subframe during this time 430, the receiver portion of the transceiver 225 may be set to a power saving mode. Further, the subframe buffer 414, PDSCH channel estimation module 415, PDSCH demodulation module 416 and the PDSCH decoding module 417 are not executed.

Column 440 (time 3) demonstrates that a first PDSCH subframe repetition is received. The reception of the PDSCH subframe means that the receiver portion of the transceiver 225 was on. As mentioned above, the UE 110 has estimated that the UE 110 should receive the PDSCH subframe three times before commencing certain PDSCH operations. Thus, in response to the reception of the first PDSCH subframe repetition at the first time, the UE 110 buffers at least a portion of the first PDSCH subframe repetition (as shown in row 414) and does not activate the PDSCH channel estimation module 415, the PDSCH demodulation module 416, or the PDSCH decoding module 417. In contrast, legacy approaches would attempt to perform these PDSCH operations after receiving the first PDSCH subframe at time 3 (440).

Column 450 (time 4) demonstrates that a second PDSCH subframe repetition is received. The reception of the PDSCH subframe means that the receiver portion of the transceiver 225 was on. Since this is the second PDSCH subframe repetition the UE 110 has received, and ss described above, in this example, the UE 110 has estimated that three PDSCH subframe repetitions should be received before commencing certain PDSCH operations, the UE 110 buffers at least a portion of the second PDSCH subframe repetition. At this time, the UE 110 is now buffering at least a portion of the first PDSCH subframe repetition and at least a portion of the second PDSCH subframe repetition (as shown in row 414). Further, based on the estimation, the UE 110 would avoid a likely unsuccessful attempt to perform certain PDSCH operations and would not activate the PDSCH channel estimation module 415, the PDSCH demodulation module 416, or the PDSCH decoding module 417. In contrast, legacy approaches would, for the second time, unsuccessfully attempt to perform these PDSCH operations after receiving the second PDSCH subframe repetition.

Column 460 (time 5) demonstrates that a third PDSCH subframe repetition is received. The reception of the PDSCH subframe means that the receiver portion of the transceiver 225 was on. Since this is the third PDSCH subframe repetition the UE 110 has received and the UE 110 has estimated that three PDSCH subframes should be received before commencing certain PDSCH operations, the UE 110 buffers at least a portion of the third PDSCH subframe repetition. Since the UE 110 has determined that three PDSCH subframe repetitions is when the operations should commence, the third PDSCH subframe repetition may not be buffered, but may be used immediately in combination with the buffered PDSCH subframe repetitions to perform the PDSCH operations. It is noted that while the UE 110 has now received the desired number (three) of PDSCH subframes, the PDSCH channel estimation module 415, the PDSCH demodulation module 416 and the PDSCH decoding module 417 are still not activated because these modules will not be activated until the complete third subframe is received, e.g. after the completion of time 5 (column 460).

Column 470 (time 6) demonstrates that a fourth PDSCH subframe repetition is received. The reception of the PDSCH subframe means that the receiver portion of the transceiver 225 was on. Since this is the fourth PDSCH subframe repetition the UE 110 has received and the UE 110 has estimated that three PDSCH subframes should be received before commencing certain PDSCH operations, the UE 110 performs certain PDSCH operations using the buffered first PDSCH subframe repetition, buffered second PDSCH subframe repetition and the buffered third PDCH subframe repetition because the UE 110 has determined that certain PDSCH operations should be successful after receiving three PDSCH subframe repetitions. Accordingly, the UE 110 would activate the PDSCH channel estimation module 415, the PDSCH demodulation module 416, or the PDSCH decoding module 417. Thus, the channel estimation, demodulation, or decoding may be performed while the UE 110 is receiving the fourth PDSCH subframe repetition at time 6 (column 470).

Column 480 (time 7) demonstrates that after the RL has been reached by the eNB, the eNB may not transmit any subframes to the UE 110. It is to be noted that this is merely for illustrative purposes. Thus, the UE 110 does not receive any subframes at this time. Accordingly, the receiver portion of the transceiver 225 is set to power saving mode and the PDSCH channel estimation module 415, the PDSCH demodulation module 416, and the PDSCH decoding module 417 are not activated. This assumes that the operations were performed successfully during time 6 (column 470). If one or more operations were not successful, the UE 110 may re-attempt the operations at time 7 (column 480) using information from all four PDSCH subframe repetitions. Further, since the UE 110 already successfully performed PDSCH operations (e.g. demodulation, decoding, channel estimation, etc.) the buffer 414 of the UE 110 may be flushed to no longer include data corresponding to the previously received subframe repetitions.

Latency corresponding to certain operations (e.g. demodulation, decoding, channel estimation, etc.) may also cause unnecessary power drain for the UE. For example, conventional systems initiate certain operations only after the entire duration of a subframe has been received. However, a UE may be capable of initiating these operations based on only a first portion of the subframe. Thus, conventional systems may be unnecessarily waiting to receive the remaining portion of the subframe and delaying the UE's transition to a power saving or sleep mode.

Figure 5:
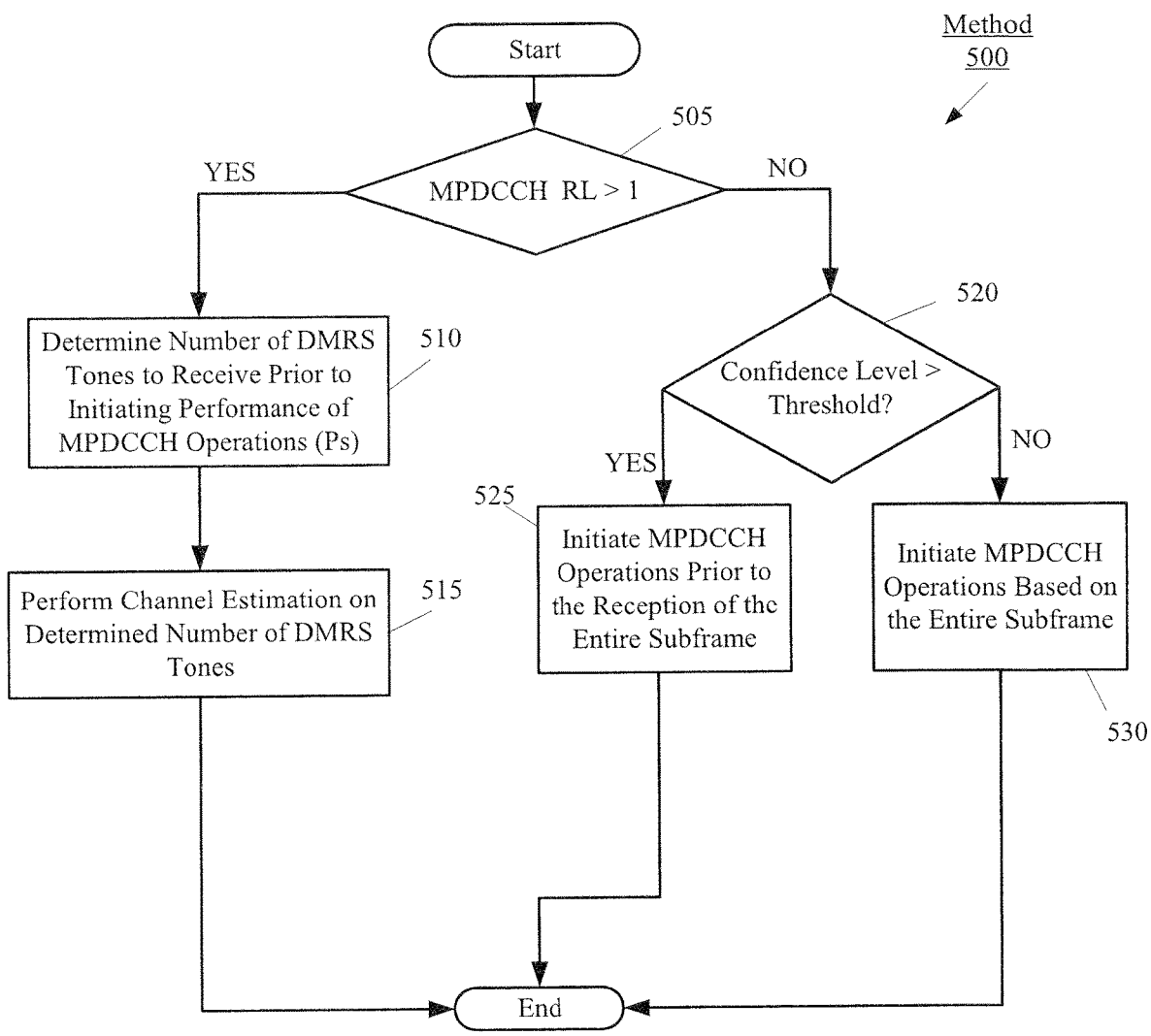
FIG. 5 shows a method for initiating MPDCCH related operations according to various exemplary embodiments described herein.
Figure 6:
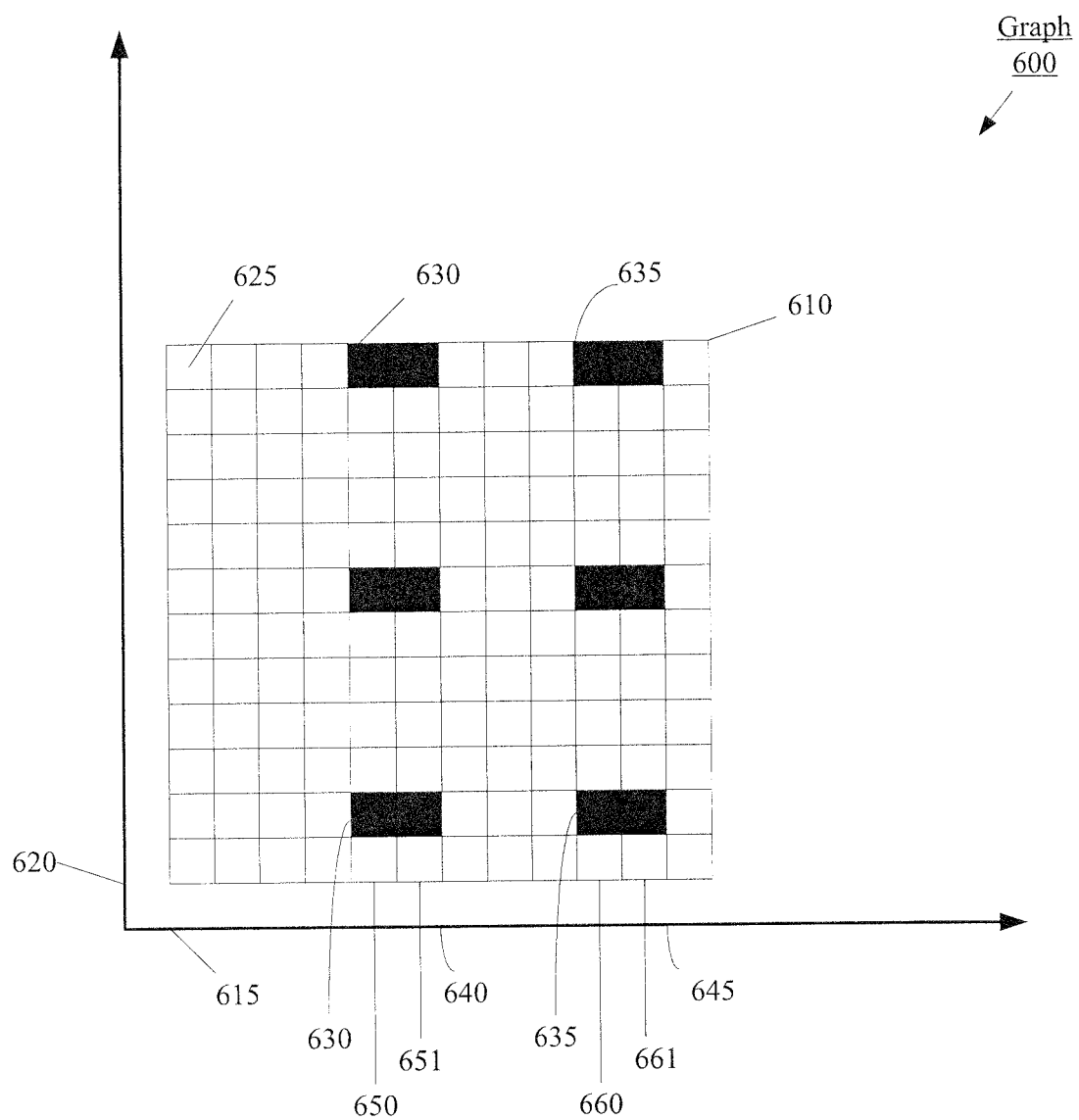
FIG. 6 shows a graph that provides an example of when a UE initiates certain MPDCCH related operations according to various exemplary embodiments described herein.

FIG. 5 shows a method 500 for initiating MPDCCH related operations (e.g. demodulation, decoding, channel estimation, etc.) according to various exemplary embodiments. The method 500 will be described with regard to the network arrangement 100 of FIG. 1 and the UE 110 of FIG. 2. The method 500 relates to when the UE 110 initiates performance of certain MPDCCH operations on received subframes. It should be noted that the method 500 will be described with regard to a MPDCCH and DMRS tones. However, the use of the MPDCCH and corresponding DMRS tones is merely exemplary and the method 500 may be performed utilizing a PDSCH and CRS tones or any other type of telecommunication channel and corresponding tones. More generally, instead of specific tones, it may be considered that the operations may be based on the receipt of certain OFDM symbols within the subframes. It should be further noted that the method 500 will described with regard to a subframe that includes a first portion with a first set of DMRS tones and a second portion with a second set of DMRS tones, where the first portion includes a first set of OFDM symbols and the second portion includes a second set of OFDM symbols. For example, referring to FIG. 6, the MPDCCH subframe 610 includes a first set of DMRS tones 630 included in OFDM symbols 650 and 651 and a second set of DMRS tones 635 included in OFDM symbols 660 and 661. However, a subframe configured in this fashion is merely for illustrative purposes and the exemplary embodiments may utilize a subframe that may be configured in any manner.

It should be further noted that the method 500 will be described with regard to the UE 110 after the UE 110 has been powered on and connected to the LTE-RAN 122 via the corresponding eNB 122A. Further, the method 500 will be described with regard to narrow bandwidth operations. However, as mentioned above the exemplary embodiments are not limited to narrow bandwidth operations and may apply to any type of operating bandwidth.

In 505, it is determined whether the MPDCCH RL is greater than one. The eNB 122A may determine the RL and may indicate the RL to the UE 110. As mentioned above, during the establishment of the connection between the UE 110 and the eNB 122A, the eNB 122A configures a repetition level (RL) that corresponds to a number of repeated subframes that will be transmitted to the UE 110. In general, it may be considered that the channel is good when the eNB 122A sets the RL to one and the channel is poor to medium when the eNB 122A sets the RL to greater than one. For example, the eNB 122A may set the RL to three and subsequently transmit, to the UE 110, a first subframe repetition at a first time, a second subframe repetition at a second time and a third subframe repetition at a third time. However, it should be noted that the use of three repetitions is merely for illustrative purposes and the RL may be set to any number. Further, it should be noted that reference to a RL is merely for illustrative purposes and different eNBs or different networks may refer to the determination of the number of subframes to transmit to a UE in a different manner. Alternatively, the UE 110 may determine, independently from the eNB 122A, whether the RL set by the eNB 122A is greater than one based on a variety of factors. For example, the UE 110 may determine that the RL is greater than one in a similar manner that the UE 110 estimates the number of subframes (Ns) in 305.

Figure 7:
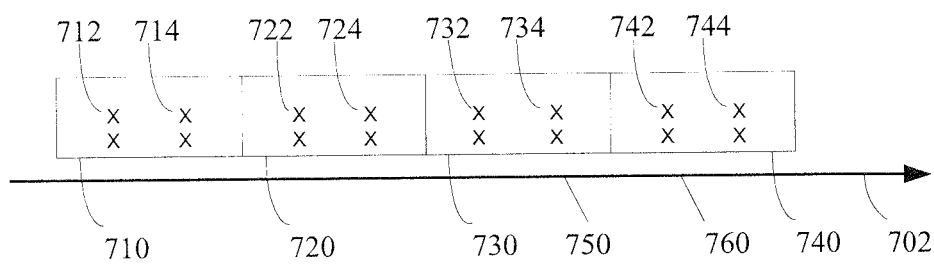
FIG. 7 shows a graph that provides an example of when a UE initiates certain MPDCCH related operations according to exemplary embodiments described here.

If the MPDCCH RL is greater than one, then the method continues to 510. In 510, the UE 110 determines the number of DMRS tones that the UE 110 should receive prior to initiating performance of MPDCCH operations such as, demodulation or channel estimation. For example, FIG. 7 shows an example of the RL being set to four such that four MPDCCH subframe repetitions 710, 720, 730 and 740 are received by the UE 110. These four subframe repetitions each include two sets of DMRS tones, e.g. subframe 710 includes DMRS tones 712, 714, subframe 720 includes DMRS tones 722, 724, subframe 730 includes DMRS tones 732, 734 and subframe 740 includes DMRS tones 742 and

744. In 510, the UE 110 will determine whether to commence the MPDCCH operations early, e.g. at a time prior to receiving the last set of DMRS tones 744, or only after receiving all DMRS tones 712-744 of subframes 710-740. It should be noted that commencing MPDCCH operations early may include commencing MPDCCH operations at any time after receiving the first set of DMRS tones 712. It should be further noted that using sets of DMRS tones is merely for illustrative purposes and DMRS tones may be configured in any manner within a subframe. That is, the MDDCCH operations may commence after receiving any of the OFDM symbols of the subframe repetitions.

The exemplary embodiments may determine the number of DMRS tones the UE 110 may receive prior to initiating MPDCCH operations (e.g. demodulation, decoding, channel estimation, etc.) in a variety of manners. In one exemplary embodiment, the UE 110 may determine the number of DMRS tones based on an estimated MPDCCH decoding probability (Ps). The Ps provides the UE 110 with a measure of a probability of successful MPDCCH decoding and a specific set of DMRS tones that the UE 110 may receive prior to commencement of MPDCCH operations.

The UE 110 may determine the Ps based on input parameters, that include, but are not limited to, SNR, SINR, Doppler spread and the OFDM symbols received prior to the OFDM symbols including the DMRS tones. One or more of the input parameters may be used to determine a probability that the MPDCCH operations will be successful based on a number of DMRS tones received and the operating history of the UE 110. To provide a specific example and referring to FIG. 7, the UE 110 may use the single input parameter of SINR and based on the current SINR being experienced by the UE 110, the UE 110 may determine the Ps based on receiving only the first set of DMRS tones 712, receiving the first and second set of DMRS tones 712, 714 and so on until the Ps is determined for receiving all of the DMRS tones 712-744. As described above, this Ps is based on the operating history of the UE 110, e.g., when the UE 110 experienced a SINR value of X, the UE 110 needed seven sets of DMRS tones to successfully perform the MPDCCH operations in the past. It should be noted that using a single input parameter is only exemplary and that these values of Ps may be filtered (e.g. using FIR or IIR) across different MPDCCH monitoring and operations to have an accurate Ps. Each of the determined Ps values corresponding to the number of received sets of DMRS tones may then be compared to a predetermined threshold. When the threshold is satisfied, the UE 110 may then set the number of sets of DMRS tones that may be used to commence MPDCCH operations. Again, to provide a specific example, if the threshold is set to 95% and the determined probabilities, Ps, for the DMRS tones shown is FIG. 7 is as follows: 712-50%; 712,714-55%; 712, 714, 722-60%; 712, 714, 722, 724-70%; 712, 714, 722, 724, 732-80%; 712, 714, 722, 724, 732, 734-90%; 712, 714, 722, 724, 732, 734, 742-95%; and 712, 714, 722, 724, 732, 734, 742, 742-99% the UE 110 may commence MPDCCH operations after receiving the seventh set of DMRS tones 742 without waiting for the last set of DMRS tones 744. If none of the Ps satisfy the threshold, this may indicate to the UE 110 that the UE 110 may initiate MPDCCH operations based on the reception of all of the DMRS tones. It should be noted that the UE 110 may determine the MPDCCH decoding probability for only a subset of the DMRS tones corresponding to the RL and the above values are only exemplary.

In another exemplary embodiment, the UE 110 may determine the number of DMRS tones to receive prior to the commencement of MPDCCH operations based on an SNR improvement measure that may be determined as a function of a number of DMRS tones. For example, consider the example of FIG. 7 where the UE 110 receives eight sets of DMRS tones 712-744. The UE 110 may estimate a MPDCCH operation SNR based on the reception of all eight sets of DMRS tones, the reception of only seven sets of DMRS tones and the reception of only six sets of DMRS tones. Next, the UE 110 may determine the MPDCCH operation SNR improvement based on the difference between the MPDCCH operation SNR based on the reception of six, seven or eight sets of DMRS tones. The UE 110 may then determine whether the SNR improvement satisfies a predetermined threshold. For example, if there is a significant improvement in SNR based on using seven sets of DMRS tones over six sets of DMRS tones, then the threshold will be satisfied with respect to the comparison of six sets versus seven sets of DMRS tones. However, if there is little improvement between using seven sets versus using eight sets, the threshold will not be satisfied. In such an example, the UE 110 may commence MPDCCH operations after receiving the seventh set 742 of DMRS tones because receiving the eighth set 744 of DMRS tones will not offer much improvement (based on SNR) over receiving seven sets of DMRS tones. It should be noted that the above is only exemplary and based on the thresholds, either the sixth set 734, the seventh set 742 or the eighth set 744 may be used. In addition, it should be noted that the above scenario was merely for illustrative purposes and the UE 110 may determine MPDCCH operation SNR for any number of sets of DMRS tones within the subframes corresponding to the RL and the UE 110 may make determinations in any manner that indicate the reception of a particular number of DMRS tones offers an improvement in MPDCCH operations when compared to the reception of another particular number of DMRS tones. It should also be noted that SNR improvement is for exemplary purposes and UE 110 may determine when to initiate MPDCCH operations based on an improvement measure that may correlate to any factor related MPDCCH operations.

In another exemplary embodiment, the UE 110 may determine the number of DMRS tones to receive prior to the commencement of MPDCCH operations based on a look-up table. For example, the UE 110 may query a look-up table or a plurality of look-up tables stored within the memory arrangement 210. The look-up tables may be used to map certain input parameters to a value corresponding to a number of sets of DMRS tones the UE 110 may receive prior to successfully commencing the performance of MPDCCH operations. The input parameters may include, but are not limited to, SNR, transmission mode, Doppler spread and delay spread. The UE 110 may make this determination based on a single input parameter or a plurality of input parameters. For example, each input parameter may have its own corresponding look-up table that produces a corresponding value and a determination regarding the number of sets of DRMS tones may be made based on a single input parameter. Alternatively, the UE 110 may determine a number of sets of DMRS tones the UE 110 may receive prior to the commencement of MPDCCH operations based on a combination of a plurality of values produced by a plurality of look-up tables and their corresponding input parameters. Further, a look-up table may be jointly constructed from a plurality of input parameters. For example, a look-up table may be conditioned on one input parameter and there may be multiple levels of tables each being parameterized on other inputs. Thus, a first input parameter may map to either a number of sets of DMRS tones to receive prior to the commencement of MPDCCH operations or may map to an indication that a second input parameter and corresponding look-up table may be used. The second input parameter may map to either a number of sets of DMRS tones to receive prior to the commencement of MPDCCH operations or an indication that a further input parameter and corresponding look-up table may be used. Thus, the jointly constructed look-up table may determine a number of sets of DMRS tones to receive prior to the commencement of MPDCCH operations based on a single input parameter or based on a plurality of input parameters.

It should be noted that data mapped to input parameters used by the exemplary embodiments (e.g. MPDCCH decoding probability, MPDCCH operation SNR, look-up tables, etc.) may be generated by the UE 110 based on historical data related to previous determinations made by the UE 110, made by other UEs or a combination thereof. Further, this data may be generated by the network and the network may generate this data while the UE 110 is offline. The network generated data may be generated based on historical data related to the UE 110 or historical data related to a plurality of UEs. When the UE 110 goes online, the UE 110 may receive the network generated data and may either store the network generated data for use in subsequent determinations or update currently stored data in accordance with the network generated data for use in subsequent determinations. Alternatively, the UE 110 may alter the network generated data in accordance with the UE's historical data to account for differences that may be specific to the UE 110.

In 515, the UE 110 initiates MPDCCH operations (e.g. demodulation, decoding, channel estimation, etc.) based on the reception of the number of sets of DMRS tones determined in 510. As shown above, the number of sets of DMRS tones received by the UE 110 prior to the commencement of performance of MPDCCH operations may be determined to be less than the total number of DMRS tones within the total number of subframes corresponding to the RL. Thus, the UE 110 may initiate MPDCCH operations prior to the reception of all of the DMRS tones within all of the subframes corresponding to the RL.

Returning to 505, if the MPDCCH RL is equal to one then the method continues to 520. In 520, the UE 110 determines whether MPDCCH operations may be initiated prior to the reception of the entire subframe. For example, consider the subframe 610 of FIG. 6 that includes a first portion with a first set 630 of DMRS tones and a second portion with a second set 635 of DMRS tones. The UE 110 may determine to initiate MPDCCH operations based on the reception of the first portion of the subframe (e.g. after receiving OFDM symbol 651 such that only DMRS tones 630 have been received) or the entire subframe (e.g. when DMRS tones 630 and 635 have been received). However, it should be noted that this subframe configuration is merely for illustrative purposes and DMRS tones within a subframe may be configured in any manner.

Specifically, the UE 110 may determine a confidence level that corresponds to the commencement of successful performance of MPDCCH operations prior to the reception of the entire subframe. For example, the UE 110 determines a confidence level of successful MPDCCH operations using only the first set of DMRS tones in the first portion of the subframe. The confidence level may be based on conditions related to the MPDCCH and the UE 110. For example, a small Doppler spread correlates to a small channel time variation which means there is less time interpolation when performing MPDCCH operations. Thus, a small Doppler spread may correlate to a high confidence level because a small Doppler spread may correlate to consistent MPDCCH operations. Accordingly, a low Doppler spread may indicate that MPDCCH operations may be initiated based on the reception of the first set of DMRS tones.

However, the UE 110 may determine a confidence level based on a variety of input parameters that include, but are not limited to, SNR, SINR, Doppler spread and the OFDM symbols received prior to the OFDM symbols including the DMRS tones. Similar to the input parameters described above, the measured parameters used to determine the confidence level may be filtered to average across a certain time duration prior to being utilized to determine the confidence level. Thus, the measured parameters may be processed by a filter to account for noise and ensure smoothness of measured parameter related data. Again, the filter may be a FIR filter or an IIR filter. The confidence level may also be determined based on the history of partial demodulation rate, an aggregation of the input parameters, a look-up table or a jointly constructed look-up table. It should be noted that the factors related to a confidence level are merely for illustrative purposes and the UE 110 may determine a confidence level based on any factor related to the commencement of successful performance of MPDCCH operations prior to the reception of an entire subframe. The confidence level is then compared to a predetermined threshold. If the confidence level satisfies the predetermined threshold, this may indicate to the UE 110 that successful channel estimation may be performed based on reception of the first set of DMRS tones within the first portion of the subframe. If the confidence level does not satisfy the predetermined threshold, this may indicate to the UE 110 that commencement of MPDCCH operations may be based on the reception of the entire subframe.

In 525, the UE 110 initiates MPDCCH operations prior to the reception of the entire subframe based on the confidence level having satisfied a predetermined threshold. Thus, the UE 110 may initiate MPDCCH operations based on the reception of the first set of DMRS tones within the subframe. Since the UE 110 is initiating these MPDCCH operations prior to the reception of the entire subframe the UE 110 may be able enter sleep mode or power saving mode earlier than if it had waited to receive all of the DMRS tones within the subframe.

In 530, the UE initiates MPDCCH operations based on the reception of the entire subframe because the confidence level failed to satisfy the predetermined threshold. Thus, the UE 110 initiates MPDCCH operations based on the reception of the first set of DMRS tones and the second set of DMRS tones.

As described above, FIG. 6 shows a graph 600 that illustrates when a UE 110 initiates certain MPDCCH operations when the MPDCCH RL is set to 1 according to the method 500. Thus, graph 600 will be described with reference to 520, 525 and 530. The graph 600 illustrates a MPDCCH subframe 610. It should be noted that the subframe 610 is merely for illustrative purposes and a subframe may be configured in a variety of other ways. The x-axis 615 of the graph 600 represents time and the y-axis 620 of the graph 600 represents frequency. Thus, subframe 610 occupies a particular bandwidth for a particular time duration.

Within the subframe 610 there are a plurality of OFDM symbols 625 and each symbol may contain data such as a DMRS tone. For instance, the subframe 610 includes a first set of DMRS tones 630 and a second set of DMRS tones 635. As shown above, the UE 110 may only receive the first set of DMRS tones 630 prior to the initiation of the certain MPDDCH operations (e.g. demodulation, decoding, channel estimation) based on a determined confidence level. In contrast, conventional systems do not make such a determination and require the reception of the entire subframe 610 prior to commencement of these MPDCCH operations.

As mentioned above, the graph 600 illustrates when a UE 110 initiates certain MPDCCH operations if the MPDCCH RL is set to 1 according to the method 500. Thus, the subframe 610 may be a first MPDCCH subframe received at a first time. Based on subframe 610, the UE 110 will determine a confidence level of whether the MPDCCH operation will be successful using only the first set of DMRS tones 630. For example, the confidence level may be based on the comparison of Doppler spread to a predetermined threshold and/or the comparison of SNR to a predetermined threshold. If the confidence level indicates that the UE 110 may initiate certain MPDCCH operations based on only the reception of the first set of DMRS tones 630 then the UE 110 may initiate the MPDCCH operations at time 640 which occurs after the reception of the first set of DMRS tones 630. If the confidence level indicates that the UE 110 should initiate MPDCCH operations based on the reception of the entire subframe 610, then the UE 110 may initiate the MPDCCH operations at time 645 which occurs after the reception of the entire subframe 610.

As also described above, FIG. 7 shows a graph 700 that illustrates when a UE 110 initiates certain MPDCCH operations when the MPDCCH RL is set to four according to the method 500. The graph illustrates a first subframe repetition 710, a second subframe repetition 720, a third subframe repetition 730 and a fourth subframe repetition 740. The x-axis 702 of the graph 700 represents time. Thus, the subframes 710-740 are received in a sequential order and the first subframe repetition 710 is received by the UE 110 prior to subframe repetitions 720-740, the second subframe repetition 720 is received after the first subframe repetition 710 and before subframe repetitions 730-740, etc.

Further, the first subframe repetition 710 includes a first set of DMRS tones 712 and a second set of DMRS tones 714. The second subframe repetition includes a first set of DMRS tones 722 and a second set of DMRS tones 724. The third subframe repetition 730 includes a first set of DMRS tones 732 and a second set of DMRS tones 734. The fourth subframe repetition 740 includes a first set of DMRS tones 742 and a second set of DMRS tones 744. Thus, each subframe repetition 710-740 includes a first set of DMRS tones and a second set of DMRS tones. It should be noted that the DMRS tone configuration is merely for illustrative purposes and DMRS tones may be configured in any manner within a subframe.

According to the exemplary embodiments, when the MPDCCH RL is greater than one the UE 110 may determine the number of DMRS tones (or OFDM symbols that include the DMRS tones) that may be received prior to commencing certain MPDCCH operations. For example, as described in detail above, the UE 110 may determine a MPDCCH decoding probability, determine a SNR improvement or utilize a look-up table to determine the number of DMRS tones. Based on this determination, the UE 110 may initiate performance of the MPDCCH operations (e.g. demodulation, decoding, channel estimation) prior to the reception of the entirety of the last subframe repetition corresponding to the RL.

For example, consider a MPDCCH RL set to four and a UE 110 that has determined that six sets of DMRS tones should be received prior to initiating MPDCCH operations. Thus, the UE 110 may receive subframe repetition 710 at a first time, subframe repetition 720 at a second time, subframe 730 repetition at a third time and subframe repetition 740 at a fourth time. Based on the determination of six sets of DMRS tones, the UE 110 may commence MPDCCH operations at time 750 which is after the reception of the second set of DMRS tones 734 within subframe repetition 730. Accordingly, the UE 110 initiates MPDCCH operations prior to at least the reception of subframe repetition 740.

Alternatively, consider a MPDCCH set to four and a UE 110 that has determined that seven sets of DMRS tones should be received prior to initiating MPDCCH operations. Based on this determination, the UE 110 may commence MPDCCH operations at time 760 which is after the reception of the first set of DMRS tones 742 within subframe repetition 740. Accordingly, the UE 110 initiates MPDCCH operations prior to the reception of the second set of DMRS tones 744 within subframe repetition 740.

Figure 8:
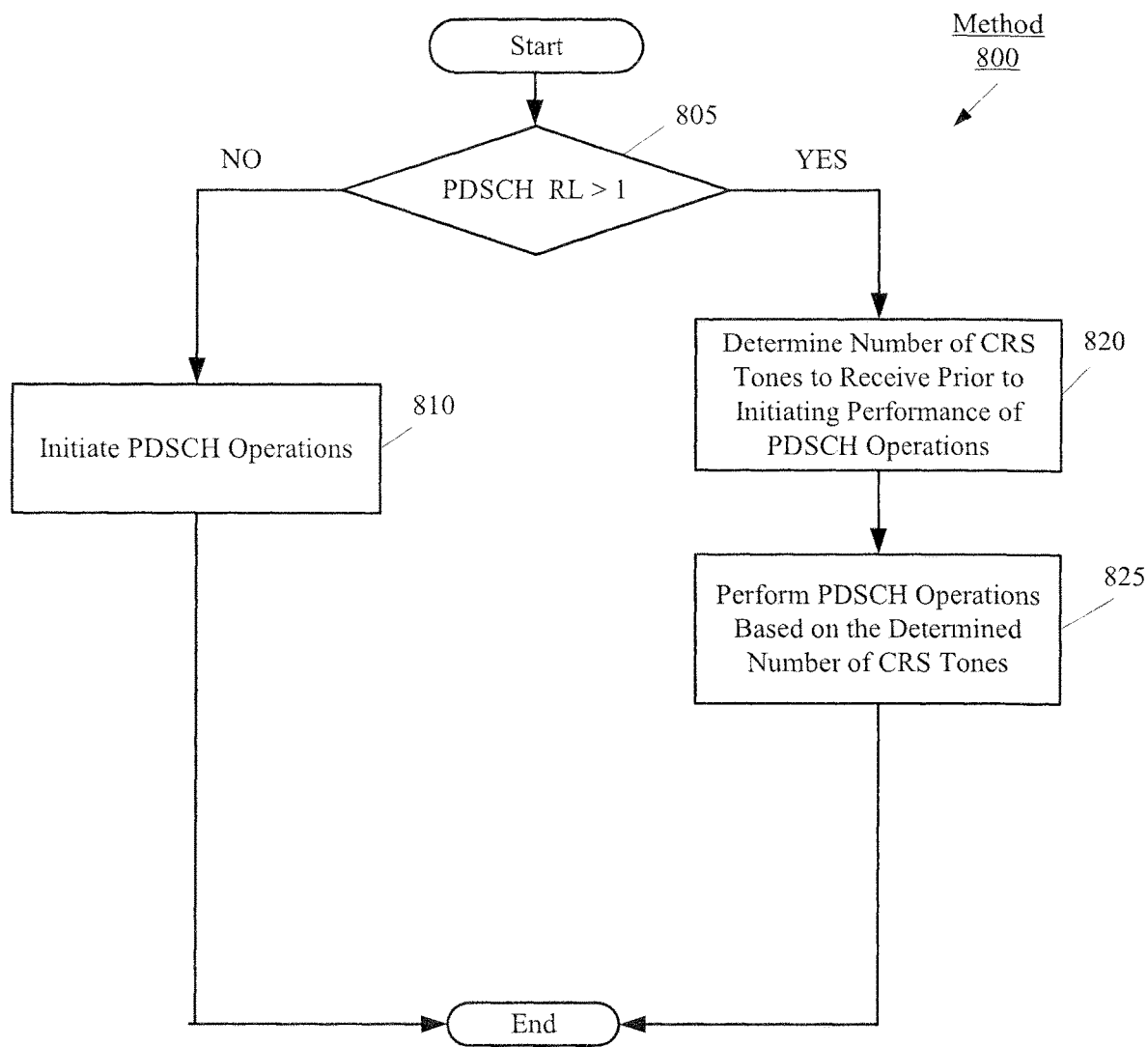
FIG. 8 shows a method for initiating PDSCH related operations according to various exemplary embodiments described herein.

As mentioned above, the exemplary embodiments may also apply to other communications channels such as the PDSCH. FIG. 8 shows a method 800 for initiating PDSCH related operations (e.g. demodulation, decoding, channel estimation, etc.). The method 800 will be described with regard to the network arrangement 100 of FIG. 1 and the UE 110 of FIG. 2. Specifically, the method 800 relates to when the UE 110 initiates performance of certain PDSCH operations on received subframes.

Initially, it should be noted that the method 800 will be described with regard to the UE 110 after the UE 110 has been powered on and connected to the LTE-RAN 122 via the corresponding eNB 122A. Further, the method 800 will be described with regard to narrow bandwidth operations. However, as mentioned above the exemplary embodiments are not limited to narrow bandwidth operations and the exemplary embodiments may utilize any operating bandwidth.

In 805, it is determined whether the PDSCH reception level (RL) is greater than one. The eNB 122A determines the RL to be used and may indicate to the UE 110 that the RL may be more than one. As mentioned above, during the establishment of the connection between the UE 110 and the eNB 122A, the eNB 122A configures a RL that corresponds to a number of subframes that will be sent to the UE 110. For example, the eNB 122A may set the RL to three and subsequently transmit, to the UE 110, a first subframe at a first time, a second subframe at a second time and a third subframe at a third time. However, it should be noted that the use of three repetitions is merely for illustrative purposes and the RL may be set to any number.

If the RL is equal to one, the method continues to 810 and if the RL is greater than one the method continues to 820. In 810, the RL is equal to one and thus, only a first PDSCH subframe may be received by the UE 110. Accordingly, the UE 110 may initiate performance of PDSCH operations based on the reception of the first subframe. Subsequently, the method 800 ends. However, it should be noted that the UE 110 may determine to initiate PDSCH operations based on the reception of a first portion of the first subframe similar to the scheme described above with respect to FIG. 6.

If the RL is greater than one, the method continues to step 820. In 820, the UE 110 determines the number of CRS tones the UE 110 may receive prior to commencing PDSCH operations (e.g. demodulation, decoding, channel estimation, etc.). The UE 110 may determine the number of CRS tones in a plurality of ways.

In one exemplary embodiment the UE 110 may determine a plurality of PDSCH decoding probabilities for a plurality of different sets of CRS tones within the subframes corresponding to the RL. The PDSCH decoding probabilities may be determined in a similar manner as the MPDCCH decoding probabilities described in 510. Thus, a plurality of PDSCH decoding probabilities may be determined for a plurality of different number of sets of CRS tones. Input parameters for determining PDSCH decoding probabilities may include, but are not limited to, SNR, SINR, Doppler spread and PDSCH block error rate (BLER). The outputted probabilities indicate a measure of probability of successful PDSCH decoding in relation to the reception of a particular set of CRS tones.

In another exemplary embodiment, the UE 110 may determine the number of CRS tones the UE 110 may receive prior to commencement of PDSCH operations based on a PDSCH operation SNR improvement as a function of a number of sets of CRS tones. This determination is similar to the MPDCCH operation SNR improvement described in 510. Thus, a UE 110 may determine a PDSCH operation SNR for each set of CRS tones the UE 110 may receive in relation to the RL. The UE 110 may determine a PDSCH operation SNR based on the reception of a particular set of CRS tones based on input parameters that may include, but are not limited to, SNR, SINR and Doppler spread. Next, the PDSCH operation SNR measures may be compared to one another. The output of the comparison indicates an improvement in PDSCH operations SNR offered by the reception of an additional set of CRS tones. Further, the UE 110 may determine whether the PDSCH operation SNR improvement satisfies a predetermined threshold. If a PDSCH operation SNR improvement satisfies the predetermined threshold, this may indicate to the UE 110 the number of CRS tones that may be received prior to the commencement of PDSCH operations and thus, when the UE 110 may initiate PDSCH operations.

Another exemplary embodiment for determining the number of CRS tones the UE 110 may receive prior to the commencement of PDSCH operations is a look-up table. For example, the UE 110 may query a look-up table or a plurality of look-up tables stored within the memory arrangement 210. The look-up tables may be used to map certain input parameters to a value corresponding to a number of CRS tones the UE 110 may receive prior to commencing performance of PDSCH operations. The input parameters may include, but are not limited to, SNR, transmission mode, doppler spread, delay spread and PDSCH BLER. The UE 110 may make this determination based on a single input parameter or a plurality of input parameters. For example, each input parameter may have its own corresponding look-up table that produces a corresponding value. The UE 110 may determine a number of CRS tones the UE 110 may receive prior to the commencement of performance of MPDCCH operations based on a value produced by a single input parameter. Alternatively, a plurality of values produced by a plurality of look-up tables and their corresponding input parameters may be used. Further, a look-up table may be jointly constructed from a plurality of input parameters. For example, a look-up table may be conditioned on one input parameter and there may be multiple levels of tables each being parameterized on other inputs. Thus, a first input parameter may map to either indication of a particular number of sets of CRS tones the UE 110 may receive prior to commencing performance of certain MPDCCH operations value or an indication that a second input parameter may be used. The second input parameter may map to either an indication of a particular number of sets of CRS tones the UE 110 may receive prior to the commencement of PDCSH operations or an indication that a further input parameter may be used.

In 825, the UE 110 initiates PDSCH operations using the number of CRS tones determined in 820. Thus, the UE 110 may initiate PDSCH operations (e.g. demodulation, decoding, channel estimation, etc.) on less CRS tones than the total number of CRS tones within the total number of subframes corresponding to the PDSCH RL. Subsequently, the method 800 ends.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at a user equipment (UE):
estimating a first number of repetitions (Ns) of a subframe which is associated with a likelihood that the UE will successfully perform an operation based on the subframe; and
delaying initiating the operation for the subframe until a received number of repetitions of the subframe (Nr) is greater than or equal to the first number of repetitions (Ns).

2. The method of claim 1, further comprising:
when the received number of repetitions (Nr) is less than the first number of repetitions (Ns), buffering at least a portion of the received repetition.

3. The method of claim 2, wherein the operation is performed using the buffered at least a portion of the received repetition.

4. The method of claim 1, wherein the estimating the first number of repetitions (Ns) is based on an input parameter, wherein the input parameter comprises one of a signal-to-noise ratio (SNR), a signal-to-interference-plus-noise ratio (SINR), a transmission mode, a doppler spread, or a delay spread.

5. The method of claim 4, wherein the estimating the first number of repetitions (Ns) is based on one of a table stored in the UE mapping the input parameter to a value of Ns or a mapping of the input parameter to the value of Ns based on a previous experience of a successful operation of the UE.

6. The method of claim 1, wherein the operation is one of a channel estimation, a demodulation or a decoding.

7. The method of claim 1, wherein the subframe is one of a Physical Downlink Shared Channel (PDSCH) subframe or a CAT-M1 physical downlink control channel (MPDCCH).

8. The method of claim 1, wherein the subframe is received in a narrow bandwidth range from a base station of a network.

9. A user equipment (UE), comprising:
a transceiver configured to establish a connection with a cell;
a baseband processor connected to the transceiver and configured to perform operations comprising:
estimating a first number of repetitions (Ns) of a subframe which is associated with a likelihood that the UE will successfully perform an operation based on the subframe; and
delaying initiating the operation for the subframe until a received number of repetitions of the subframe (Nr) is greater than or equal to the first number of repetitions (Ns).

10. The UE of claim 9, wherein the operations further comprise:
when the received number of repetitions (Nr) is less than the first number of repetitions (Ns), buffering at least a portion of the received repetition.

11. The UE of claim 10, wherein the operation is performed using the buffered at least a portion of the received repetition.

12. The UE of claim 9, wherein the estimating the first number of repetitions (Ns) is based on an input parameter, wherein the input parameter comprises one of a signal-to-noise ratio (SNR), a signal-to-interference-plus-noise ratio (SINR), a transmission mode, a doppler spread, or a delay spread.

13. The UR of claim 9, wherein the operation is one of a channel estimation, a demodulation or a decoding.

14. The UE of claim 9, wherein the subframe is one of a Physical Downlink Shared Channel (PDSCH) subframe or a CAT-MI physical downlink control channel (MPDCCH).

15. The UE of claim 9, wherein the subframe is received in a narrow bandwidth range from the cell.

16. A method comprising:
at a user equipment (UE):
determining a number of repetitions of a subframe to be received by the UE, wherein each of the repetitions of the subframe includes a plurality of OFDM symbols;
when the number of repetitions is equal to one, determining whether to initiate an operation based on receiving all the OFDM symbols of the subframe or a portion of the OFDM symbols of the subframe, wherein the operation is one of a channel estimation or a demodulation; and
when the number of repetitions is greater than one, determining whether to initiate the operation based on receiving all the OFDM symbols of the number of repetitions of the subframe or less than all of the OFDM symbols of the number of repetitions of the subframe.

17. The method of claim 16, wherein determining whether to initiate an operation based on receiving all the OFDM symbols of the subframe or a portion of the OFDM symbols of the subframe comprises:
determining a confidence level that the operation will be successful using the portion of the OFDM symbols of the subframe, wherein the confidence level is based on a measured parameter, wherein the measured parameter is one of a signal-to-noise ratio (SNR), a signal-to-interference-plus-noise ratio (SINR), a doppler spread or previously received OFDM symbols; and
when the confidence level satisfies a threshold, initiating the operation based on the portion of the OFDM symbols of the subframe.

18. The method of claim 17, wherein the subframe is a CAT-M1 physical downlink control channel (MPDCCH) subframe comprising a first set of OFDM symbols having at least two sets of DMRS tones and a second set of OFDM symbols having at least two sets of DMRS tones and the portion of the OFDM symbols comprises the first set of OFDM symbols and not the second set of OFDM symbols.

19. The method of claim 17, wherein, when the confidence level does not satisfy the threshold, the method further comprises:
initiating the operation after receiving all the OFDM symbols of the subframe.

20. The method of claim 17, wherein a filter is applied to the measured parameter to filter the measured parameter over a time duration, wherein the filter is one of a finite impulse response (FIR) filter or an infinite impulse response (IIR) filter.

21. The method of claim 16, wherein determining whether to initiate the operation based on receiving all the OFDM symbols of the number of repetitions of the subframe or less than all of the OFDM symbols of the number of repetitions of the subframe, further comprises:
estimating a number of OFDM symbols to be used for the operation; and
when the number of OFDM symbols is less than a total number of OFDM symbols in the number of repetitions, using less than all of the OFDM symbols to initiate the operation.

22. The method of claim 21, wherein estimating a number of OFDM symbols to be used for the operation, comprises:
estimating a decoding probability for each of a plurality of the OFDM symbols, wherein the decoding probability is based on one of signal-to-noise ratio (SNR), a signal-to-interference-plus-noise ratio (SINR), a doppler spread or a decoding block error rate (BLER); and
estimating the number of OFDM symbols based on the decoding probability for one of the OFDM symbols satisfying a threshold, wherein the number of OFDM symbols corresponds to the one of the OFDM symbols satisfying the threshold.

23. The method of claim 21, wherein estimating a number of OFDM symbols to be used for the operation, comprises:
estimating a first signal-to-noise ratio (SNR) based on a first plurality of OFDM symbols;
estimating a second SNR based on a second plurality of OFDM symbols, wherein the second plurality of OFDM symbols includes all of the first plurality of OFDM symbols;
determining an SNR improvement from the first SNR to the second SNR; and
comparing the SNR improvement to a threshold, wherein, when the SNR improvement satisfies the threshold, using the second plurality of OFDM symbols as the number of OFDM symbols, and
when the SNR improvement does not satisfy the threshold, using the first plurality of OFDM symbols as the number of OFDM symbols.

24. A user equipment (UE), comprising:
a transceiver configured to establish a connection with a cell;
a baseband processor connected to the transceiver and configured to perform operations comprising:
determining a number of repetitions of a subframe to be received by the UE; and,
wherein each of the repetitions of the subframe includes a plurality of OFDM symbols;

when the number of repetitions is equal to one, determining whether to initiate an operation based on receiving all the OFDM symbols of the subframe or a portion of the OFDM symbols of the subframe; and when the number of repetitions is greater than one, determining whether to initiate the operation based on receiving all the OFDM symbols of the number of repetitions of the subframe or less than all of the OFDM symbols of the number of repetitions of the subframe.

25. The UE of claim 24, wherein the baseband processor determines whether to initiate an operation based on receiving all the OFDM symbols of the subframe or a portion of the OFDM symbols of the subframe by:

determining a confidence level that the operation will be successful using the portion of the OFDM symbols of the subframe; and when the confidence level satisfies a threshold, initiating the operation based on the portion of the OFDM symbols of the subframe.

26. The UE of claim 24, wherein the baseband processor determines whether to initiate the operation based on receiving all the OFDM symbols of the number of repetitions of the subframe or less than all of the OFDM symbols of the number of repetitions of the subframe by:

estimating a number of OFDM symbols to be used for the operation; and when the number of OFDM symbols is less than a total number of OFDM symbols in the number of repetitions, using less than all of the OFDM symbols to initiate the operation.

27. The UE of claim 9, wherein the estimating the first number of repetitions (Ns) is based on one of a table stored in the UE mapping the input parameter to a value of Ns or a mapping of the input parameter to the value of Ns based on a previous experience of a successful operation of the UE.

* * * * *